United States Patent
Christophe et al.

(12) 
(10) Patent No.: US 6,368,513 B1
(45) Date of Patent: Apr. 9, 2002

(54) FILTERING ASSEMBLY AND METHOD INCLUDING REMOVAL OF IMPURITIES FROM A BACKWASH FLUID

(75) Inventors: Théophile Christophe, Fontenay le Fleury; Jean-Claude Moatti, Suresnes, both of (FR)

(73) Assignee: Alfa Laval Moatti SNC, Les Clayes sous Bois (FR)

(*) Notice: Subject to any disclaimer, the term of this patent is extended or adjusted under 35 U.S.C. 154(b) by 0 days.

(21) Appl. No.: 09/581,805
(22) PCT Filed: Dec. 17, 1999
(86) PCT No.: PCT/FR98/02760
§ 371 Date: Jun. 16, 2000
§ 102(e) Date: Jun. 16, 2000
(87) PCT Pub. No.: WO99/32210
PCT Pub. Date: Jul. 1, 1999

(30) Foreign Application Priority Data

Dec. 19, 1997 (FR) .............................. 97 16148
Dec. 17, 1998 (FR) .............................. 98 02760

(51) Int. Cl.[7] .............................................. B01D 24/26
(52) U.S. Cl. .......................... 210/781; 210/87; 210/97; 210/340; 210/424; 210/411; 210/295; 210/360.1; 210/798
(58) Field of Search .................. 210/87, 97, 295, 210/298, 297, 340, 360.1, 411, 420, 423, 424, 308, 781, 791, 798; 494/36

(56) References Cited

U.S. PATENT DOCUMENTS

| | | | |
|---|---|---|---|
| 3,241,676 A | * | 3/1966 | Neuville et al. |
| 5,296,137 A | * | 3/1994 | Gershon et al. |
| 5,674,392 A | | 10/1997 | Christophe et al. |
| 6,058,899 A | * | 5/2000 | Schetter |

FOREIGN PATENT DOCUMENTS

GB    2 297 499 A    8/1996    ........... B01D/29/66

OTHER PUBLICATIONS

International Preliminary Examination Report.
International Search Report.

* cited by examiner

Primary Examiner—Joseph W. Drodge
Assistant Examiner—Terry K. Cecil
(74) Attorney, Agent, or Firm—Cohen, Pontani, Lieberman & Pavane

(57) ABSTRACT

An assembly for automatically and continuously purifying a polluted fluid P includes a main separator 1, a secondary separator 2 having a centrifuge 21 and filter 22 therein, and a backwashing device 11. In operation, the backwashing device returns a fraction of purified fluid E1 to backwash the main separator. The resulting backwashing fluid F is then delivered to the secondary separator via a multi-port valve V where the backwashing fluid is centrifuged and/or filtered to remove impurities therefrom.

22 Claims, 3 Drawing Sheets

FILTERING ASSEMBLY AND METHOD INCLUDING REMOVAL OF IMPURITIES FROM A BACKWASH FLUID

The present invention relates to an assembly for automatically purifying a polluted fluid, and to a method of implementing said assembly.

The invention relates more particularly to treating oils and gas oils for internal combustion engines.

Patent FR 2 725 917 describes a fluid treatment assembly comprising a main separator provided with a backwashing device fed with a fraction of the purified fluid, and a secondary separator fed via the outlet duct of said backwashing device with said fraction as charged with impurities.

Unfortunately, the secondary separator is made up of only one centrifuge whose treatment capacity is constant. The capacity is set once and for all by design to accommodate the mean flow rate of the fraction of fluid that is charged with impurities to be treated and that is delivered from the outlet duct of the backwashing device.

That flow rate is itself dependent on the total flow rate of polluted fluid coming from the motor.

Unfortunately, for a given engine, the polluted fluid flow rate can vary to a considerable extent, in particular as a function of the load on the engine, and it can exceed the predicted values.

Under such conditions, it is sometimes not possible to treat all of the flow rate of charged fluid resulting from backwashing the main separator.

A non-negligible fraction of highly-polluted fluid then returns to the tank, which can ultimately cause the fluid circuits of the engine to become clogged, giving rise to mechanical or hydraulic breakdowns.

In addition, the centrifuge can separate out only those impurities which are of a determined density that corresponds in general to precise values for the pressure and rotation speed parameters.

Thus, impurities that are of density different from the reference value are not always separated out.

When the spectrum of the impurities becomes relatively wide, the effectiveness of the secondary separator is thus significantly reduced.

That also results in problems of clogging and of risks of premature wear or breakdowns.

An object of the present invention is to solve the above-mentioned technical problems satisfactorily by adjusting the capacity and the selectivity of the secondary separator to match respectively the flow rates to be treated and the density of the impurities.

This object is achieved by means of an assembly for automatically and continuously purifying a polluted fluid, said assembly comprising a main separator provided with a backwashing device fed with a fraction of the purified fluid, and a secondary separator fed via the outlet duct of said backwashing device with said fraction of fluid as charged with impurities;

said assembly being characterized in that said secondary separator comprises a combination of a centrifuge device and of a filter device whose capacity and selectivity can be varied as a function firstly of the flow rate of said fraction of fluid charged with impurities and secondly of the range of densities of said impurities.

According to an advantageous characteristic, said centrifuge device and said filter device are mounted in parallel on the outlet duct of the backwashing device.

In a first embodiment, said centrifuge device comprises at least one centrifuge and preferably two centrifuges in parallel.

In another embodiment, said filter device comprises at least one filter having filtering walls.

According to another characteristic, the outlet duct of the backwashing device is equipped with a multi-port valve making it possible to isolate at least a portion of the centrifuge device and/or of the filter device.

According to yet another characteristic, said secondary separator and said main separator are enclosed inside a common casing.

In a particular embodiment, the outlet duct of the backwashing device has a rectilinear upstream segment which extends coaxially with the longitudinal axis of the main separator and which splits into two downstream branches that diverge or that extend in opposite directions, each of which feeds a respective portion of the secondary separator.

In a variant embodiment, said secondary separator is disposed transversely to the main separator.

In another variant, said secondary separator and said main separator are disposed side-by-side.

The invention also provides a method of automatically and continuously purifying a polluted fluid, said method comprising retaining impurities in a main separator, backwashing the main separator with a fraction of purified fluid, and entraining said fraction as charged with impurities to a secondary separator where the impurities are extracted from said fraction;

said method being characterized in that, in the secondary separator, said fraction charged with impurities is centrifuged and filtered, and in that the capacity and the selectivity of the secondary separator are adjusted as a function respectively of the flow rate of said fraction charged with impurities, and of the density of said impurities.

According to a characteristic of the method, the capacity and the selectivity of the secondary separator are adjusted automatically by feeding all or a portion of it or by isolating all or a portion of it.

The purification assembly and the method of the invention make it possible to obtain highly-effective separation of the impurities with a wide density spectrum and regardless of the flow rate of the polluted fluid to be treated.

Regulating and adapting operation of the secondary separator to match the characteristics of the polluted fluid to be purified is performed automatically. By combining a filter with a centrifuge inside the secondary separator, it is possible to guarantee a high level of fluid clarification.

In addition, all of the components of the purification assembly are enclosed in a common casing in an ergonomic layout offering maximum compactness.

The invention will be better understood on reading the following description with reference to the accompanying drawings, in which.

Figure 1:
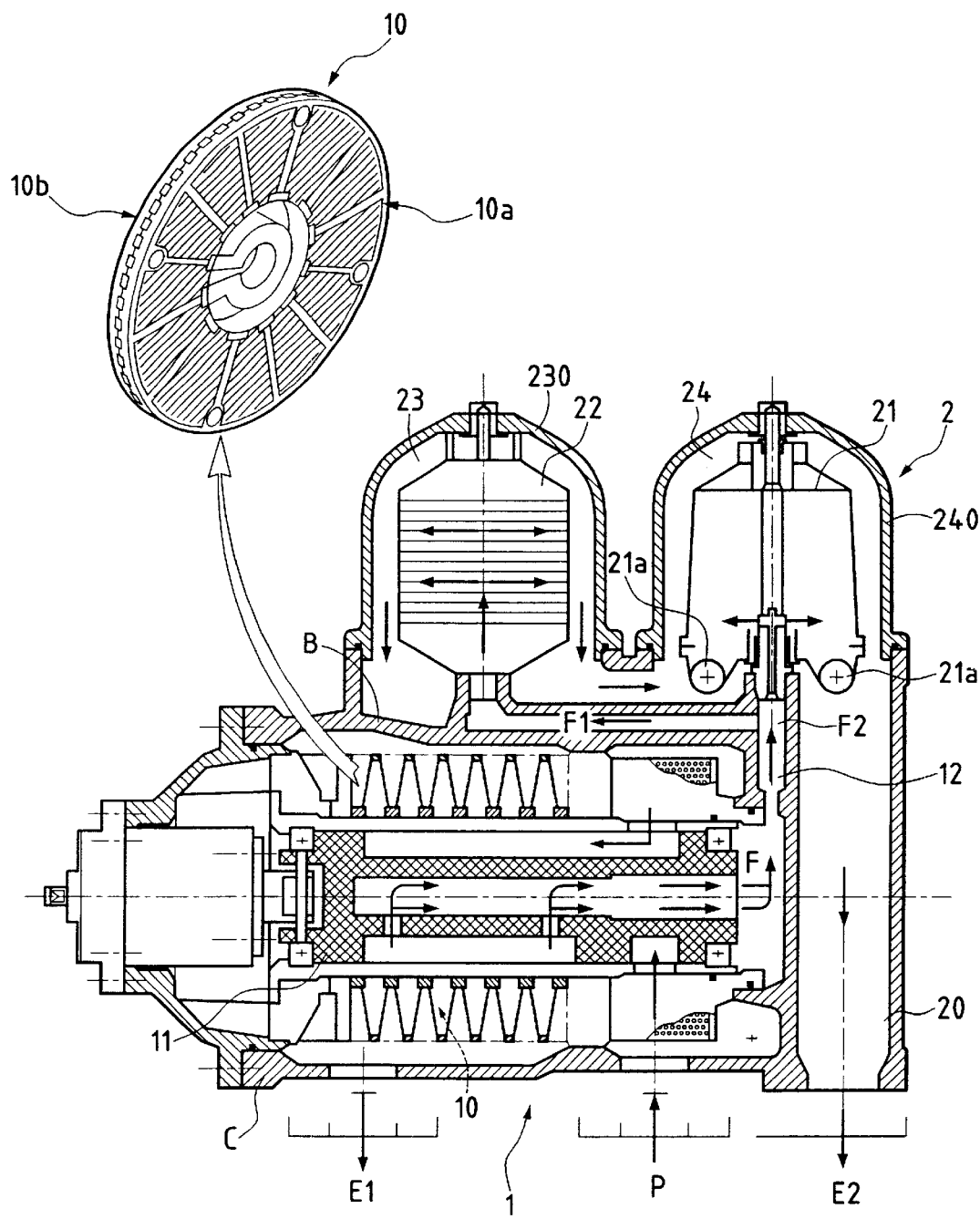
FIG. 1 is a section view of a first embodiment of the purification assembly of the invention.

The treatment assembly shown in the figures is designed for automatically and continuously purifying a polluted fluid P (such as a lubricant, oil, etc.) coming, for example, from an internal combustion engine. Once the impurities with which the fluid becomes charged while it is being used have been removed from it, it must be recovered and optionally recycled in the form of a purified fluid.

To this end, the purification assembly comprises a main separator 1 enclosed in a casing C, and made up, for example, of a series of filter elements 10 in the form of a stack.

In this example, the filter elements 10 are in the shape of disks, both faces 10a, 10b of each disk being provided with screens.

The main separator 1 is provided with a backwashing device 11 for backwashing the filter elements 10. The backwashing device 11 performs backwashing with a fraction of the purified fluid $E_1$, thereby enabling the filter elements to be unclogged, and the impurities that were retained by the filter elements to be entrained in a fraction F of said fluid.

The purification assembly further comprises a secondary separator 2 fed via the outlet duct 12 of the backwashing device 11 with the fraction F of fluid charged with impurities.

The main separator 1 and the secondary separator 2 are enclosed in a common casing C.

The purpose of the secondary separator is to extract as large a quantity as possible of the impurities present in the fraction F so as to deliver a minority fraction $E_2$ of purified fluid, suitable for being returned to the fluid tank or for being recycled directly in the engine together with the majority fraction $E_1$ of fluid purified by the main separator 1.

However, the flow rate of polluted fluid P to be treated in the main separator 1 can vary. Such variation causes fluctuations in the flow rate of the fraction F. When such fluctuations are constituted by a significant increase in the flow rate of the fraction F, the secondary separator must be capable of treating the entire flow rate with the same effectiveness as it does when it treats lower flow rates.

Regardless of the flow rate to be treated, the fraction $E_2$ of fluid must have a predetermined degree of purity that is in the vicinity of the degree of purity of the fraction $E_1$.

Similarly, the characteristics (size, density, etc.) of the impurities to be separated out can vary over relatively wide ranges, and the treatment implemented in the secondary separator must result in the largest possible number of impurities being separated out.

To these ends, and in the invention, provision is made for the secondary separator to comprise a centrifuge device 21 and a filter device 22 whose capacity and selectivity can be varied as a function firstly of the flow rate of the fraction F of fluid charged with impurities, and secondly of the range of densities of said impurities.

In the embodiment shown in FIG. 1, the main separator 1 and the secondary separator 2 are mounted side-by-side. The centrifuge device 21 and the filter device 22 are mounted in parallel on the outlet duct 12 of the backwashing device 11.

Thus a portion $F_2$ of the flow fees the centrifuge device 21 while an additional portion F feeds the filter device 22.

Preferably, the filter device 22 comprises at least one filter having filtering walls or selective screens, while the centrifuge device 21 comprises at least one centrifuge, and preferably two centrifuges in parallel (second centrifuge not illustrated). The capacities and the speeds of rotation of the centrifuges may optionally differ from one centrifuge to the other, as may the selectivity (or pore size) of the various filters, so as to adjust the treatment as a function of the respective characteristics of the flow F and of the impurities to be treated.

After being filtered, the flow $F_1$ flows into a fist chamber 23 surrounding the filter and communicating with a second chamber 24 enclosing the centrifuges.

The chambers 23, 24 are delimited outside the frame B of the main separator 1 by removable covers 230, 240 making it possible for maintenance to be performed on the filter device 22 and on the centrifuge device 21.

The centrifuges are rotated by means of the reaction effect of the purified fluid which flows out via opposite nozzles 21a, 21b of the centrifuge 21, relative to the fluid contained in the chamber 24.

In the second chamber 24, the purified flows $F_1$ and $_2$ mix together to form a fraction $E_2$ which is removed from the casing C via a duct 20.

Figure 3:
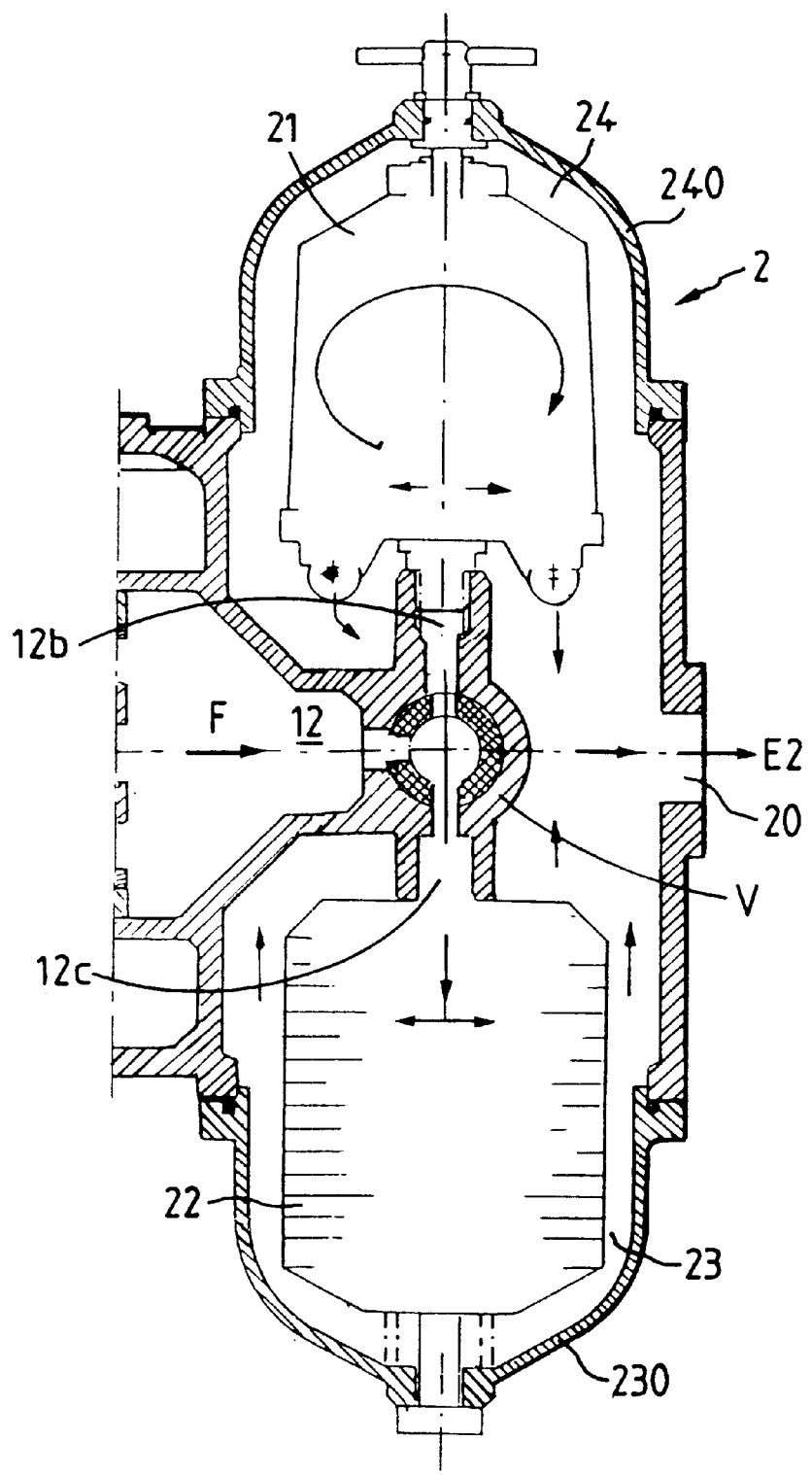
FIG. 3 is a fragmentary section view of a variant embodiment of the secondary separator of the invention.

Preferably, as shown in FIG. 3, the outlet duct 12 of the backwashing device is equipped with a multi-port valve V making it possible to open or to isolate all or at least a portion of the secondary separator, in particular when the flow rate of the fraction F varies.

Th valve V is controlled automatically by an actuator (A) coupled to a flow meter (FM) mounted on the duct 12, or further upstream, so as to adjust automatically the treatment capacity and the selectivity of the secondary separator.

The value V is connected to the outlet duct 12 of the backwashing device, and it is disposed in the center of the secondary separator 2 between the centrifuge chamber 24 and the filter chamber 23.

Figure 2:
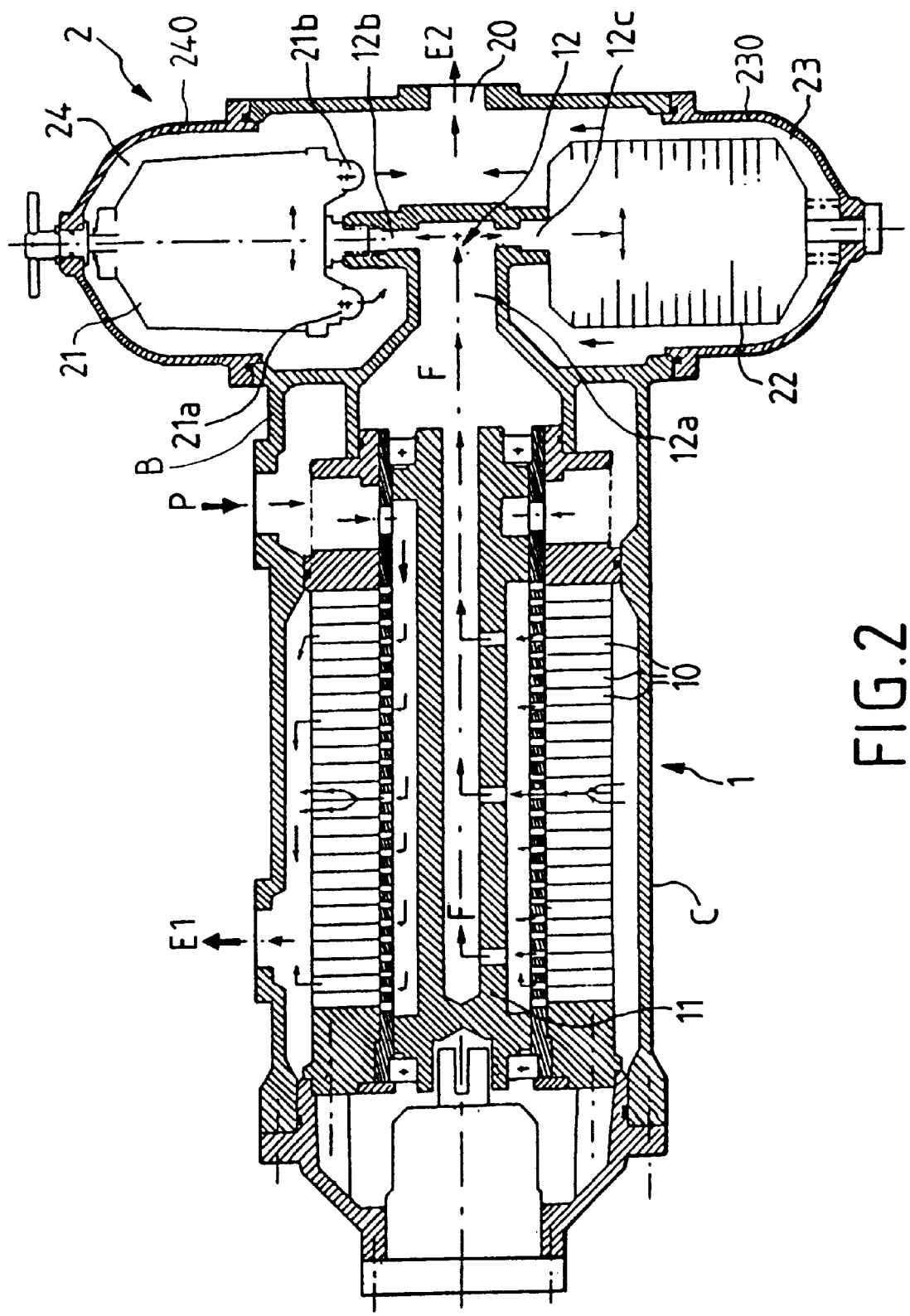
FIG. 2 is a section view of a second embodiment of the purification assembly of the invention.

In the embodiment shown in FIG. 2, the secondary separator 2 is disposed transversely to the main separator 1.

In which case, the outlet duct 12 of the backwashing device 11 has a rectilinear upstream segment 12a which extends coaxially to the longitudinal axis of the main separator 1 and which splits into two downstream branches 12b, 12c diverging or extending in opposite directions at 180° to each other, each branch feeding a respective portion of the secondary separator 2.

In this example, the branch 12b extends towards the centrifuge device 21, while the branch 12c leads to the filter device 22.

What is claimed is:

1. An assembly for automatically and continuously purifying a polluted fluid (P), said assembly comprising:
   a. a main separator (1) provided with a backwashing device (11) for a separator system (10), the backwashing device (11) receiving, following the passage of a fraction of purified fluid (E1) through the separator system (10), a fraction of backwashing fluid (F) charged with impurities from the separator system (10);
   b. a secondary separator (2) fed via an outlet duct (12) of said backwashing device (11) with said fraction of backwashing fluid (F) charged with impurities, said secondary separator (2) comprising in combination:
      i. a centrifuge device (21) including at least one centrifuge, and
      ii. a filter device (22) including at least one filter having filtering walls; and
   c. a multi-port valve disposed in the outlet duct (12) of the backwashing device, said multi-port valve adapted to allow each of the filter and centrifuge device to receive all or a portion of the backwashing fluid F from the outlet duct (12).

2. An assembly according to claim 1, characterized in that said centrifuge device (21) and said filter device (22) are mounted in parallel on the outlet duct (12) of the backwashing device (11).

3. An assembly according to claim 2, characterized in that said centrifuge device (21) comprises two centrifuges in parallel.

4. An assembly according to claim 3, characterized in that said secondary separator (2) and said main separator (1) are enclosed inside a common casing (c).

5. An assembly according to claim 3, characterized in that the outlet duct (12) of the backwashing device (11) has a rectilinear upstream segment (12a) which extends coaxially with the longitudinal axis of the main separator (1) and which splits into two downstream branches (12b, 12c) that diverge, respectively feeding the centrifuge device and the filter device.

6. An assembly according to claim 2, characterized in that the multi-port valve is controlled automatically by an actuator coupled to a flow meter mounted on the outlet duct (12).

7. An assembly according to claim 2, characterized in that said secondary separator (2) and said main separator (1) are enclosed inside a common casing (c).

8. An assembly according to claim 7, characterized in that the outlet duct (12) of the backwashing device (11) has a rectilinear upstream segment (12a) which extends coaxially with the longitudinal axis of the main separator (1) and which splits into two downstream branches (12b, 12c) that diverge, respectively feeding the centrifuge device and the filter device.

9. An assembly according to claim 2, characterized in that the outlet duct (12) of the backwashing device (11) has a rectilinear upstream segment (12a) which extends coaxially with the longitudinal axis of the main separator (1) and which splits into two downstream branches (12b, 12c) that diverge, respectively feeding the centrifuge device and the filter device.

10. An assembly according to claim 1, characterized in that said centrifuge device (21) comprises two centrifuges in parallel.

11. An assembly according to claim 10, characterized in that the multi-port valve is controlled automatically by an actuator coupled to a flow meter mounted on the outlet duct (12).

12. An assembly according to claim 10, characterized in that said secondary separator (2) and said main separator (1) are enclosed inside a common casing (c).

13. An assembly according to claim 12, characterized in that the outlet duct (12) of the backwashing device (11) has a rectilinear upstream segment (12a) which extends coaxially with the longitudinal axis of the main separator (1) and which splits into two downstream branches (12b, 12c) that diverge, respectively feeding the centrifuge device and the filter device.

14. An assembly according to claim 10, characterized in that the outlet duct (12) of the backwashing device (11) has a rectilinear upstream segment (12a) which extends coaxially with the longitudinal axis of the main separator (1) and which splits into two downstream branches (12b, 12c) that diverge, respectively feeding the centrifuge device and the filter device.

15. An assembly according to claim 1, characterized in that said secondary separator (2) and said main separator (1) are enclosed inside a common casing (c).

16. An assembly according to claim 15, characterized in that the multi-port valve is controlled automatically by an actuator coupled to a flow meter mounted on the outlet duct (12).

17. An assembly according to claim 15, characterized in that the outlet duct (12) of the backwashing device (11) has a rectilinear upstream segment (12a) which extends coaxially with the longitudinal axis of the main separator (1) and which splits into two downstream branches (12b, 12c) that diverge, respectively feeding the centrifuge device and the filter device.

18. An assembly according to claim 1, characterized in that the outlet duct (12) of the backwashing device (11) has a rectilinear upstream segment (12a) which extends coaxially with the longitudinal axis of the main separator (1) and which splits into two downstream branches (12b, 12c) that diverge, respectively feeding the centrifuge device and the filter device.

19. An assembly according to claim 18, characterized in that the two downstream branches (12b, 12c) of the centrifuge and filter devices are perpendicular to the upstream segment (12a) of the outlet duct (12) of the backwashing device, and in that the two branches (12b, 12c) extend in opposite directions at 180° to each other.

20. An assembly according to claim 18, characterized in that the multi-port valve is controlled automatically by an actuator coupled to a flow meter mounted on the outlet duct (12).

21. An assembly according to claim 1, characterized in that the multi-port valve is controlled automatically by an actuator coupled to a flow meter mounted on the outlet duct (12).

22. A method of automatically and continuously purifying a polluted fluid (P), said method comprising the steps of:
 a. retaining impurities from the polluted fluid (P) in a main separator (1);
 b. backwashing the main separator (1) with a fraction of purified fluid (El) to produce a fraction of backwashing fluid (F) charged with said impurities;
 c. delivering said fraction of backwashing fluid (F) to a secondary separator (2) comprising a centrifuge and a filter having filtering walls, wherein the amount of backwashing fluid delivered to each of said centrifuge and said filter is selectively controlled; and
 d. extracting said impurities from said fraction of backwashing fluid (F) by centrifuging and filtering said fraction of backwashing fluid (F) in said secondary separator (2).

* * * * *